US 9,840,247 B2

(12) United States Patent
Sato

(10) Patent No.: US 9,840,247 B2
(45) Date of Patent: Dec. 12, 2017

(54) HYBRID VEHICLE

(71) Applicant: TOYOTA JIDOSHA KABUSHIKI KAISHA, Toyota-shi, Aichi-ken (JP)

(72) Inventor: Keita Sato, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 125 days.

(21) Appl. No.: 14/974,258

(22) Filed: Dec. 18, 2015

(65) Prior Publication Data
US 2016/0176391 A1 Jun. 23, 2016

(30) Foreign Application Priority Data

Dec. 19, 2014 (JP) ................................ 2014-257650

(51) Int. Cl.
*B60W 10/06* (2006.01)
*B60W 10/08* (2006.01)
(Continued)

(52) U.S. Cl.
CPC ............ *B60W 10/08* (2013.01); *B60K 6/445* (2013.01); *B60W 10/06* (2013.01); *B60W 20/15* (2016.01); *B60W 2510/244* (2013.01); *B60W 2540/10* (2013.01); *B60Y 2200/10* (2013.01); *B60Y 2300/43* (2013.01); *B60Y 2300/60* (2013.01); *B60Y 2400/61* (2013.01); *Y02T 10/6239* (2013.01); *Y02T 10/6286* (2013.01); *Y02T 10/7258* (2013.01); *Y10S 903/93* (2013.01)

(58) Field of Classification Search
CPC ...... B60W 20/10; B60W 10/08; B60W 10/06; B60K 6/442
See application file for complete search history.

(56) References Cited

U.S. PATENT DOCUMENTS

2007/0151783 A1* 7/2007 Yamauchi ................ B60K 5/08
180/65.31
2014/0012452 A1* 1/2014 Blessing .................. B60K 6/48
701/22
(Continued)

FOREIGN PATENT DOCUMENTS

JP 2013-252853 12/2013
JP 2016-117376 A 6/2016

*Primary Examiner* — Yonel Beaulieu
*Assistant Examiner* — Martin Weeks
(74) *Attorney, Agent, or Firm* — Finnegan, Henderson, Farabow, Garrett & Dunner, LLP

(57) ABSTRACT

A hybrid vehicle includes an internal combustion engine, an electric power storage device, an electric motor, and an electronic control unit. The internal combustion engine is configured to generate a traveling driving force. The electric motor is configured to generate a traveling driving force by receiving electric power supply from the electric power storage device. The electronic control unit is configured to control the internal combustion engine and the electric motor during switching between a selected state of a first mode and a selected state of a second mode such that a speed at which a vehicle driving torque approaches a value subsequent to the switching of the selection state from a value prior to the switching of the selection state within a predetermined period of time from a time point of the switching is lower than the speed subsequent to an elapse of the predetermined period of time.

6 Claims, 10 Drawing Sheets

(51) Int. Cl.
*B60K 6/445* (2007.10)
*B60W 20/15* (2016.01)

(56) References Cited

U.S. PATENT DOCUMENTS

2015/0344018 A1* 12/2015 Shimoyama ............ B60K 6/48
　　　　　　　　　　　　　　　　　　　701/22
2016/0176310 A1　6/2016 Sato et al.

* cited by examiner

HYBRID VEHICLE

INCORPORATION BY REFERENCE

The disclosure of Japanese Patent Application No. 2014-257650 filed on Dec. 19, 2014 including the specification, drawings and abstract is incorporated herein by reference in its entirety.

BACKGROUND OF THE INVENTION

1. Field of the Invention

The invention relates to a hybrid vehicle and, more particularly, to a hybrid vehicle that is provided with an internal combustion engine, an electric power storage device, and an electric motor which generates a traveling driving force by receiving electric power supply from the electric power storage device.

2. Description of Related Art

Japanese Patent Application Publication No. 2013-252853 (JP 2013-252853 A) discloses a hybrid vehicle that has a charge depleting (CD) mode and a charge sustaining (CS) mode. The CD mode is a mode in which a state of charge (SOC) of an electric power storage device is actively consumed by EV traveling being proactively performed while HV traveling is allowed. The CS mode is a mode in which the SOC is controlled within a predetermined range based on an appropriate switching between the HV traveling and the EV traveling. During the EV traveling, traveling is performed by the use of a motor generator alone with an engine stopped. During the HV traveling, traveling is performed with the engine in operation. Also disclosed is a threshold of power for starting the engine higher in the CD mode than in the CS mode (refer to JP 2013-252853 A).

In the hybrid vehicle disclosed in JP 2013-252853 A, a difference between the traveling in the CD mode and the traveling in the CS mode is realized by an opportunity of the EV traveling being changed between the CD mode and the CS mode. In other words, in the hybrid vehicle described above, the threshold of the power for starting the engine is higher in the CD mode than in the CS mode so that the opportunity of the EV traveling is expanded in the CD mode. In this manner, the difference between the traveling in the CD mode and the traveling in the CS mode is realized.

Power electronics technology has developed to improve performances of motors, inverters, electric power storage devices, and the like and enable an increase in motor output. Because of this technical background and a variety of driving force sources (engine and motor) to choose from for the hybrid vehicle, the realization of a special traveling with a high level of user satisfaction has been desired, in the CD mode in particular, with regard to the hybrid vehicle that has the CD mode and the CS mode.

It is conceivable that driving force characteristics of the vehicle are changed between the CD mode and the CS mode for the realization of the special traveling in the CD mode. Specifically, it is conceivable that the driving force characteristics are changed between the CD mode and the CS mode such that a vehicle driving torque with respect to the same vehicle speed and the same accelerator opening degree is higher in the CD mode than in the CS mode. In this manner, an acceleration performance of the EV traveling in the CD mode is improved, and a strong sense of acceleration can be obtained during the EV traveling while the opportunity of the EV traveling is expanded in the CD mode. However, the change in the driving force characteristics associated with the switching between the CD mode and the CS mode might be uncomfortable for the user.

SUMMARY OF THE INVENTION

The invention provides a hybrid vehicle that is capable of realizing a special traveling in a mode (CD mode) in which an opportunity of EV traveling is expanded and reducing a user's discomfort attributable to the realization.

A hybrid vehicle according to an aspect of the invention includes an internal combustion engine, an electric power storage device, an electric motor, and an electronic control unit. The internal combustion engine is configured to generate a traveling driving force of the hybrid vehicle. The electric motor is configured to generate a traveling driving force of the hybrid vehicle by receiving electric power supply from the electric power storage device. The electronic control unit is configured to i) determine which one of a first mode and a second mode is selected as a traveling mode of the hybrid vehicle; ii) control the internal combustion engine and the electric motor such that switching is performed between a third mode in which the hybrid vehicle travels by using the electric motor with the internal combustion engine stopped and a fourth mode in which the hybrid vehicle travels with the internal combustion engine in operation in accordance with a state of the selection of the first mode or the second mode and a required value of vehicle power, the vehicle power being a sum of a required value of driving power of the hybrid vehicle and a required value of required charging power toward the electric power storage device; iii) control the internal combustion engine and the electric motor such that the switching is performed between the third mode and the fourth mode based on whether or not the required value of the vehicle power is equal to or higher than a threshold; iv) set the threshold such that the threshold pertaining to a case where the first mode is selected is higher than the threshold pertaining to a case where the second mode is selected; v) control the internal combustion engine and the electric motor such that a vehicle driving torque with respect to a vehicle speed and an accelerator opening degree pertaining to a case where the first mode is selected exceeds a vehicle driving torque with respect to the same vehicle speed and the same accelerator opening degree pertaining to a case where the second mode is selected; and vi) control the internal combustion engine and the electric motor during switching between the first mode-selected state and the second mode-selected state such that a speed at which the vehicle driving torque approaches a value subsequent to the switching of the selection state from a value prior to the switching of the selection state within a predetermined period of time from a time point of the switching is lower than the speed subsequent to an elapse of the predetermined period of time.

In the hybrid vehicle according to this aspect, the setting of the threshold described above allows an opportunity of EV traveling in the first mode (CD mode) to be expanded more than in the second mode (CS mode). In addition, because driving force characteristics of the vehicle are changed as described above in accordance with the switching between the first mode and the second mode, an acceleration performance of the EV traveling in the first mode is improved. Accordingly, a strong sense of acceleration can be obtained during the EV traveling while the opportunity of the EV traveling is expanded in the first mode. In addition, in a case where the driving force characteristics are changed in accordance with the mode switching in this hybrid vehicle, the driving torque subsequent to the mode switching is approached at a low speed within a predetermined period of time from the time point of the mode switching, and thus a change in the driving torque associated with the mode switching is reduced. As a result, according to this hybrid vehicle, a special traveling in the first mode can be realized and a user's discomfort associated with the realization can be reduced.

Control for allowing the vehicle driving torque to approach the post-mode switching value from the pre-mode switching value includes a manner in which the vehicle driving torque is prevented from being changed at once and stepwise from the pre-mode switching value to the post-mode switching value within a predetermined period of time from the mode switching time point and is allowed to become the post-mode switching value stepwise after the elapse of the predetermined period of time. The control for allowing the vehicle driving torque to approach the post-mode switching value from the pre-mode switching value is speed-adjusted by, for example, a rate processing for limiting a rate of the change in the vehicle driving torque, a "smoothing" processing for carrying out a delay processing using a delay filter or the like, and a processing for changing the vehicle driving torque in stages.

In the hybrid vehicle according to the aspect described above, the electronic control unit may be configured to control the internal combustion engine and the electric motor within a range in which the vehicle driving torque falls below a predetermined upper limit such that a reduction in the vehicle driving torque depending on an increase in the vehicle speed at the same accelerator opening degree is less when the first mode is selected than when the second mode is selected.

According to this aspect, the reduction in the vehicle driving torque depending on the increase in the vehicle speed is less when the first mode is selected, and thus a sense of extended acceleration is obtained. Accordingly, the special traveling in the first mode can be realized according to this hybrid vehicle.

In the hybrid vehicle according to the aspect described above, the electronic control unit may be configured to regard the time point of the switching of the selection state as a time point of the elapse of the predetermined period of time when the amount of change in the vehicle driving torque attributable to the switching of the selection state is less than a predetermined value.

When the amount of change in the vehicle driving torque attributable to the change in the driving force characteristics is less than a predetermined value, the user feels a low level of discomfort. In this regard, according to the aspect described above, the vehicle driving torque can be allowed to quickly approach the post-mode switching value from the time point of the switching, and thus a reduction in torque response can be suppressed.

In the hybrid vehicle according to the aspect described above, the electronic control unit may be configured to regard a time point when the accelerator opening degree is changed by at least a predetermined opening degree as a time point of the elapse of the predetermined period of time when the accelerator opening degree is changed by at least the predetermined opening degree during a change to the vehicle driving torque subsequent to the switching of the selection state.

According to this aspect, even in a case where control is performed such that the vehicle driving torque subsequent to the mode switching is approached at a low speed within a predetermined period of time from the mode switching time point, the torque response can be ensured in the case of the user's accelerator operation by at least the predetermined opening degree.

In the hybrid vehicle according to the aspect described above, the electronic control unit may be configured to set a time point of the elapse of the predetermined period of time in accordance with the value of the vehicle driving torque subsequent to the switching of the selection state calculated at the time point of the switching of the selection state after the switching of the selection state.

In a case where an accelerator pedal is increasingly depressed while the control is performed such that the vehicle driving torque subsequent to the mode switching is approached at a low speed within a predetermined period of time from the mode switching time point, for example, the vehicle driving torque (target value) subsequent to the mode switching increases, and thus the amount of change in the driving force characteristics increases. Then, the control for approaching the vehicle driving torque increased by the increasing depression of the accelerator pedal at a low speed continues. As a result, the user might feel uncomfortable with a reduction in accelerator response. According to this aspect, the predetermined period of time is set based on the amount of change in the mode switching time point, and thus an unnecessary reduction in the accelerator response can be prevented.

The hybrid vehicle according to the aspect described above may further include a charging mechanism configured to charge the electric power storage device by using electric power from an electric power supply outside the vehicle.

According to this aspect, the strong sense of acceleration can be realized during the EV traveling while fuel economy in the first mode is improved by the use of the electric power supplied from the electric power supply outside the vehicle.

According to the invention, a hybrid vehicle can be provided that is capable of realizing a special traveling in a first mode (CD mode) and reducing a user's discomfort resulting from the realization.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
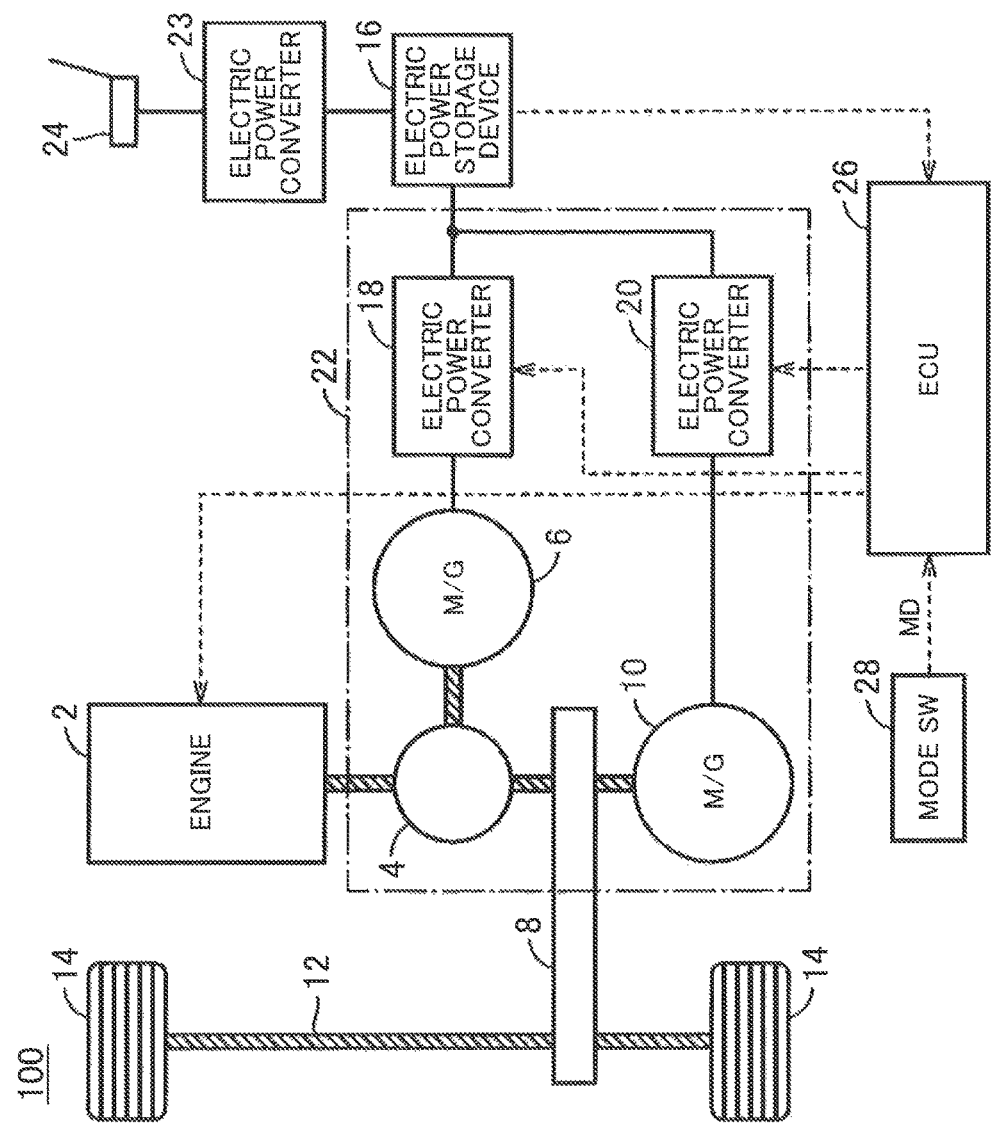
FIG. 1 is a block diagram showing an overall configuration of a hybrid vehicle according to Embodiment 1 of the invention.

Hereinafter, embodiments of the invention will be described in detail with reference to accompanying drawings. The following description covers a plurality of the embodiments, and appropriate combinations of the configurations that are described with regard to the embodiments are previously scheduled from the beginning of the application. The same reference numerals will be used to refer to the same or corresponding parts in the drawings, and description thereof will not be repeated.

Embodiment 1

FIG. 1 is a block diagram for showing an overall configuration of a hybrid vehicle according to Embodiment 1 of the invention. Referring to FIG. 1, a hybrid vehicle 100 is provided with an engine 2, a driving device 22, a transmission gear 8, a driving shaft 12, vehicle wheels 14, an electric power storage device 16, an electronic control unit (ECU) 26, and a mode switch (mode SW) 28. The hybrid vehicle 100 is provided with an electric power converter 23 and a connecting portion 24 as well.

The engine 2 is an internal combustion engine that outputs power by converting thermal energy resulting from fuel combustion into kinetic energy of a mover such as a piston and a rotor. Preferably, the fuel of the engine 2 is a hydrocarbon-based fuel such as gasoline, diesel, ethanol, liquid hydrogen, and natural gas or a liquid or gaseous hydrogen fuel.

The driving device 22 includes a power split device 4, motor generators 6, 10, and electric power converters 18, 20. The motor generators 6, 10 are AC rotating electrical machines. For example, the motor generators 6, 10 are three-phase AC synchronous electric motors in which rotors are embedded with permanent magnets. The motor generator 6 is used as a generator that is driven by the engine 2 via the power split device 4 and also used as an electric motor for starting the engine 2. The motor generator 10 is operated mainly as an electric motor and drives the driving shaft 12. During braking of the vehicle and acceleration reduction on a downward slope, the motor generator 10 is operated as a generator and performs regenerative electric power generation.

The power split device 4 includes a planetary gear mechanism that has, for example, the three rotary shafts of a sun gear, a carrier, and a ring gear. The power split device 4 splits a driving force of the engine 2 into power that is transmitted to a rotary shaft of the motor generator 6 and power that is transmitted to the transmission gear 8. The transmission gear 8 is connected to the driving shaft 12 in order to drive the vehicle wheels 14. The transmission gear 8 is connected to a rotary shaft of the motor generator 10, too.

The electric power storage device 16 is a rechargeable DC electric power supply. The electric power storage device 16 is configured to include, for example, a secondary battery such as a nickel-hydrogen battery and a lithium-ion battery, and a large-capacitance capacitor. The electric power storage device 16 supplies electric power to the electric power converters 18, 20. In addition, the electric power storage device 16 is charged by receiving generated electric power during electric power generation by the motor generator 6 and/or 10. In addition, the electric power storage device 16 can be charged by receiving electric power that is supplied through the connecting portion 24 from an electric power supply outside the vehicle.

A state of charging of the electric power storage device 16 is indicated by, for example, an SOC that is a percentage-based expression of a current electric power storage amount with respect to a fully-charged state of the electric power storage device 16. The SOC is calculated based on, for example, an output voltage and/or an input and output current of the electric power storage device 16 detected by a voltage sensor and/or a current sensor (not illustrated). The SOC may be calculated by an ECU that is additionally disposed in the electric power storage device 16 or may be calculated by the ECU 26 based on the detected value of the output voltage and/or the input and output current of the electric power storage device 16.

The electric power converter 18 executes bidirectional DC/AC electric power conversion between the motor generator 6 and the electric power storage device 16 based on a control signal received from the ECU 26. Likewise, the electric power converter 20 executes bidirectional DC/AC electric power conversion between the motor generator 10 and the electric power storage device 16 based on a control signal received from the ECU 26. In this manner, the motor generators 6, 10 can output a positive torque for the operation as the electric motor or a negative torque for the operation as the generator as a result of electric power exchange with the electric power storage device 16. The electric power converters 18, 20 are configured to have, for example, inverters. A boost converter for DC voltage conversion can also be placed between the electric power storage device 16 and the electric power converters 18, 20.

The electric power converter 23 converts electric power from an external electric power supply (not illustrated) outside the vehicle that is electrically connected to the connecting portion 24 to a voltage level of the electric power storage device 16 and outputs the converted electric power to the electric power storage device 16 (hereinafter, charging of the electric power storage device 16 by the external electric power supply will also be referred to as "external charging"). The electric power converter 23 is configured to include, for example, a rectifier and an inverter. A method for receiving the electric power of the external electric power supply is not limited to contact-based electric power reception using the connecting portion 24, and the electric power may be received on a non-contact basis from the external electric power supply by the use of a coil for electric power reception or the like instead of the connecting portion 24.

The ECU 26 includes a central processing unit (CPU), a storage device, an I/O buffer, and the like (none of which is illustrated herein), and controls each of equipment of the hybrid vehicle 100. The control is not limited to a software-based processing and can also be performed by a processing using dedicated hardware (electronic circuit).

As a main control executed by the ECU 26, the ECU 26 calculates a vehicle driving torque (required value) based on a vehicle speed and an accelerator opening degree that depends on an accelerator pedal operation amount and calculates a vehicle driving power (required value) based on the calculated vehicle driving torque. Then, the ECU 26 also calculates a required charging power for the electric power storage device 16 based on the SOC of the electric power storage device 16 and controls the engine 2 and the driving device 22 so as to generate power (hereinafter, referred to as a "vehicle power") in which the required charging power is added to the vehicle driving power.

When the vehicle power is small, the ECU 26 controls the driving device 22 so that the vehicle travels solely based on the motor generator 10 with the engine 2 stopped (EV traveling). When the vehicle power is large, the ECU 26 controls the engine 2 and the driving device 22 so that the vehicle travels with the engine 2 in operation (HV traveling).

The ECU 26 executes traveling control. The traveling control is to control the traveling of the vehicle by a selective application of a CS mode (second mode) and a CD mode (first mode). In the CS mode (second mode), the SOC is controlled within a predetermined range based on an appropriate switching between the (HV traveling and the EV traveling. In the CD mode (first mode), the SOC of the electric power storage device 16 is actively consumed to an SOC equal to or below the predetermined range by the EV traveling being proactively performed while the HV traveling is allowed.

Figure 2:
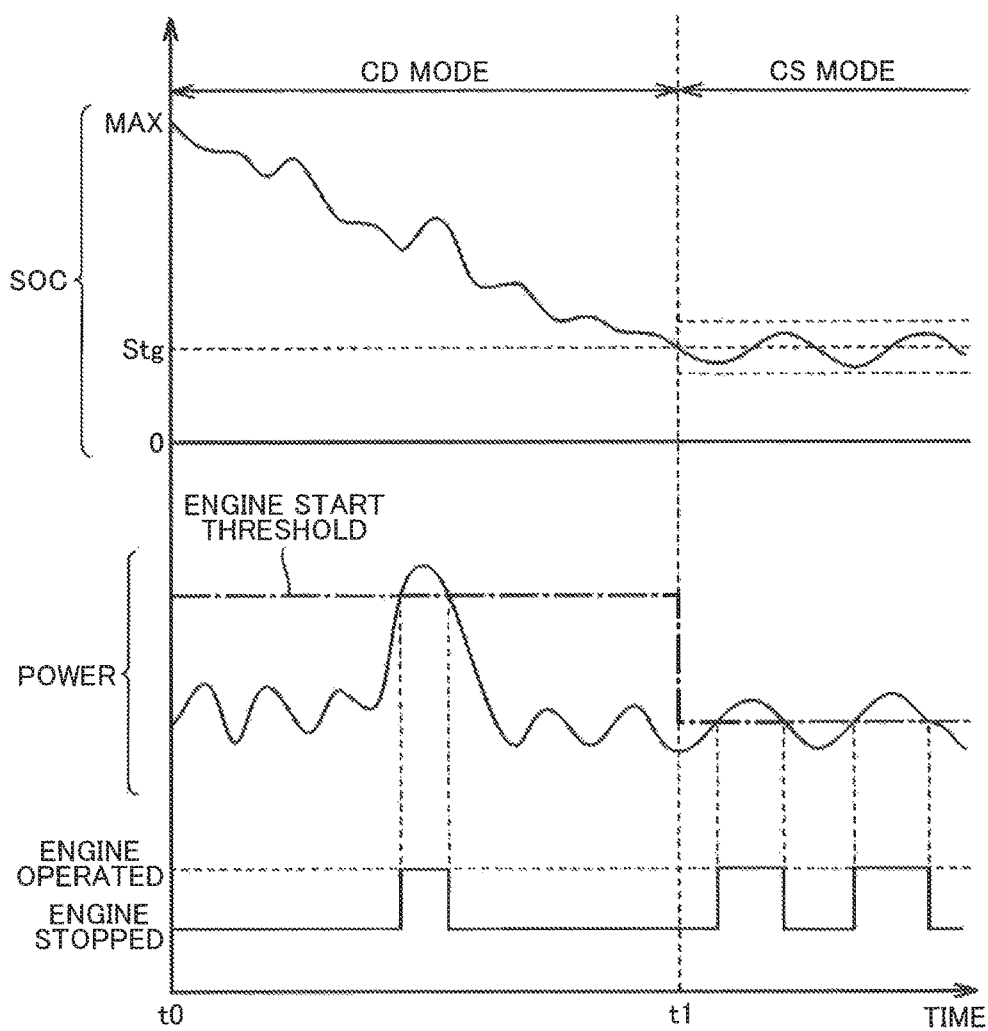
FIG. 2 is a diagram for showing a CD mode and a CS mode.

FIG. 2 is a diagram for showing the CD mode and the CS mode. Referring to FIG. 2, the traveling in the CD mode is initiated after the electric power storage device 16 is put into the fully-charged state (SOC=MAX) through the external charging by the external electric power supply.

The CD mode is a mode in which the SOC of the electric power storage device 16 is actively consumed. Basically, the CD mode is a mode in which the electric power that is stored in the electric power storage device 16 (mainly, electrical energy resulting from the external charging) is consumed. During the traveling in the CD mode, the engine 2 is not operated for the purpose of maintaining the SOC. Specifically, the required charging power for the electric power storage device 16 is set to zero when, for example, the CD mode is selected. Accordingly, although the SOC is temporarily increased by regenerative electric power recovered during a deceleration of the vehicle or the like and electric power generated as a result of the operation of the engine 2, a ratio of discharging is relatively higher than a ratio of charging in the end and the SOC is decreased as a whole by an increase in traveling distance.

The CS mode is a mode in which the SOC of the electric power storage device 16 is controlled within a predetermined range. When the SOC is reduced at time t1 to a predetermined value Stg showing a reduction in the SOC, for example, the CS mode is selected and the subsequent SOC is maintained within a predetermined range. Specifically, the engine 2 is put into operation (HV traveling: fourth mode) when the SOC is reduced, and the engine 2 is stopped (EV traveling: third mode) when the SOC rises. In other words, in the CS mode, the engine 2 is operated such that the SOC is maintained.

When the vehicle power is below a predetermined engine start threshold, this hybrid vehicle 100 travels by using the motor generator 10 with the engine 2 stopped (EV traveling). When the vehicle power is above the engine start threshold, the hybrid vehicle 100 travels with the engine 2 in operation (HV traveling). During the HV traveling, the hybrid vehicle 100 travels by using the driving force of the engine 2 in addition to a driving force of the motor generator 10 or instead of the motor generator 10. The electric power that is generated by the motor generator 6 as a result of the operation of the engine 2 during the HV traveling is directly supplied to the motor generator 10 or is stored in the electric power storage device 16.

The engine start threshold pertaining to the CD mode is higher than the engine start threshold pertaining to the CS mode. In other words, a region of the EV traveling of the hybrid vehicle 100 in the CD mode is wider than a region of the EV traveling of the hybrid vehicle 100 in the CS mode. Accordingly, in the CD mode, the frequency with which the engine 2 is started is suppressed and an opportunity of the EV traveling is expanded to exceed that in the CS mode. In the CS mode, controls is performed so that the hybrid vehicle 100 travels efficiently with both the engine 2 and the motor generator 10.

Even in the CD mode, the engine 2 is put into operation provided that the vehicle power (equal to the vehicle driving power) is above the engine start threshold. Even if the vehicle power does not exceed the engine start threshold, the operation of the engine 2 is allowed in some cases. An example of such cases is during warm-up of the engine 2 and an exhaust catalyst. Even in the CS mode, the engine 2 is stopped in the event of a rise in the SOC. In other words, the CD mode is not limited to the EV traveling in which the vehicle travels with the engine 2 stopped at all times, and the CS mode is not limited to the HV traveling in which the engine 2 is in operation at all times. Both the EV traveling and the HV traveling are possible whether in the CD mode or the CS mode.

Referring back to FIG. 1, the mode switch 28 is an input device for allowing a user to select either one of the CD mode and the CS mode. The mode switch 28 outputs a signal MD to the ECU 26 in response to the mode that is selected based on the user's operation. The mode switch 28 is optional.

When the CD mode is selected based on the SOC or in accordance with a driver's operation of the mode switch 28, the ECU 26 changes driving force characteristics of the vehicle between the CD mode and the CS mode so that the vehicle driving torque with respect to the same vehicle speed and the same accelerator opening degree becomes higher than when the CS mode is selected. This allows a strong sense of acceleration to be obtained during the EV traveling while the opportunity of the EV traveling is expanded in the CD mode. As a result, a special traveling in the CD mode can be realized. This point will be described in detail below.

Figure 3:
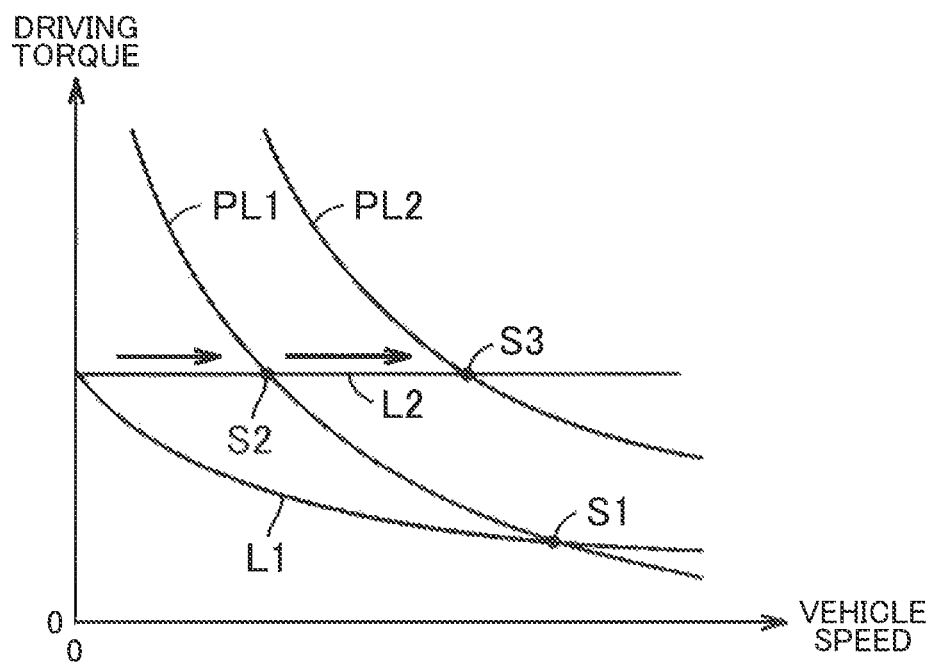
FIG. 3 is a diagram for showing a concept of a driving force characteristic of each of the CS mode and the CD mode.

FIG. 3 is a diagram for showing a concept of the driving force characteristic of each of the CS mode and the CD mode. The horizontal axis in FIG. 3 represents the vehicle speed, and the vertical axis in FIG. 3 represents the driving torque of the vehicle. Curve PL1 represents the start threshold (equal power line) of the engine 2 pertaining to a case where the CS mode is selected, and Curve PL2 represents the start threshold (equal power line) of the engine 2 pertaining to a case where the CD mode is selected. As described above, the engine 2 has a higher starting power threshold when the CD mode is selected than when the CS mode is selected.

Line L1 shows the driving force characteristic of the vehicle pertaining to a case where the accelerator opening degree is X % with the CS mode selected. In other words, when the accelerator opening degree is X % in a case where the CS mode is selected, the vehicle driving torque (required value) is determined according to this Line L1.

Line L2 shows the driving force characteristic of the vehicle pertaining to a case where the accelerator opening degree is X % with the CD mode selected. In other words, when the accelerator opening degree is X % in a case where the CD mode is selected, the vehicle driving torque (required value) is determined according to this Line L2.

The driving force characteristics appearing when the accelerator opening degree is X % are not limited to those shown by Lines L1, L2. However, in the hybrid vehicle 100 according to Embodiment 1, the driving force characteristics are changed between the CD mode and the CS mode so that the vehicle driving torque with respect to the same vehicle speed and the same accelerator opening degree becomes higher when the CD mode is selected than when the CS mode is selected.

When the CS mode is selected, the driving force characteristic is set such that the engine 2 is not started until the operation point expressed as Point S1 is reached by the driving torque being suppressed as the vehicle speed increases as shown by Line L1. When the driving force characteristic of increasing the driving torque up to the degree that is shown by Line L2 is set for the purpose of obtaining the strong sense of acceleration during the EV traveling, the engine 2 is started early at the operation point that is expressed as Point S2 and the opportunity of the EV traveling significantly decreases.

When the CD mode is selected, the starting power threshold of the engine 2 is higher than when the CS mode is selected as described above. Specifically, the engine 2 is not started until the vehicle power (vehicle driving power) reaches the line that is expressed as Curve PL2. In the hybrid vehicle 100 according to Embodiment 1, the driving force characteristics are set so that the vehicle driving torque with respect to the same vehicle speed and the same accelerator opening degree becomes higher when the CD mode is selected than when the CS mode is selected as shown by Line L2. When the CD mode is selected, the engine 2 is not started until the operation point that is expressed as Point S3 is reached even if the driving force characteristic according to Line L2 is applied. Accordingly, when the CD mode is selected, a powerful acceleration torque in the EV traveling according to Line L2 can be realized while the opportunity of the EV traveling is expanded (Point S2→Point S3).

Referring back to FIG. 1, the ECU 26 also executes a gradual change processing in a case where the driving force characteristics of the vehicle are changed in accordance with the mode switching between the CD mode and the CS mode. The gradual change processing is to change the vehicle driving torque such that the vehicle driving torque approaches a post-mode switching value from a pre-mode switching value with time. In other words, the strong sense of acceleration can be obtained during the EV traveling while the opportunity of the EV traveling is expanded in the CD mode by the driving force characteristics being changed in accordance with the mode switching. However, a change in the driving force characteristics associated with the mode switching might be uncomfortable for the user.

In this regard, the gradual change processing described above is executed in the hybrid vehicle 100 according to Embodiment 1 in a case where the driving force characteristics are changed in accordance with the mode switching. Then, a change in the driving torque associated with the mode switching is reduced. As a result, the special traveling in the CD mode can be realized and the user's discomfort associated with the change in the driving force characteristics (sharp change in the driving force) can be reduced.

The gradual change processing means that a speed at which the vehicle driving torque approaches the post-mode switching value from the pre-mode switching value within a predetermined period of time from a time point of the mode switching is lower than the speed subsequent to the elapse of the predetermined period of time. For example, the gradual change processing is to control the vehicle driving torque to approach the post-mode switching value gradually at a predetermined speed at the time point of the mode switching, instead of changing the vehicle driving torque at once and stepwise from the pre-mode switching value to the post-mode switching value, and to control the vehicle driving torque so that the vehicle driving torque is in immediate compliance with the vehicle driving torque subsequent to the mode switching or approaches the vehicle driving torque subsequent to the mode switching at a speed higher than that before the elapse of the predetermined period of time after the elapse of the predetermined period of time. The predetermined period of time is set as a period causing no discomfort on the part of users in general with respect to the change in the vehicle driving torque attributable to the mode switching. Control of the speed of the change in the gradual change processing includes, for example, a rate processing for limiting the rate of the change in the vehicle driving torque, a "smoothing" processing for carrying out a delay processing using a delay filter or the like, and a processing for changing the vehicle driving torque in stages.

Figure 4:
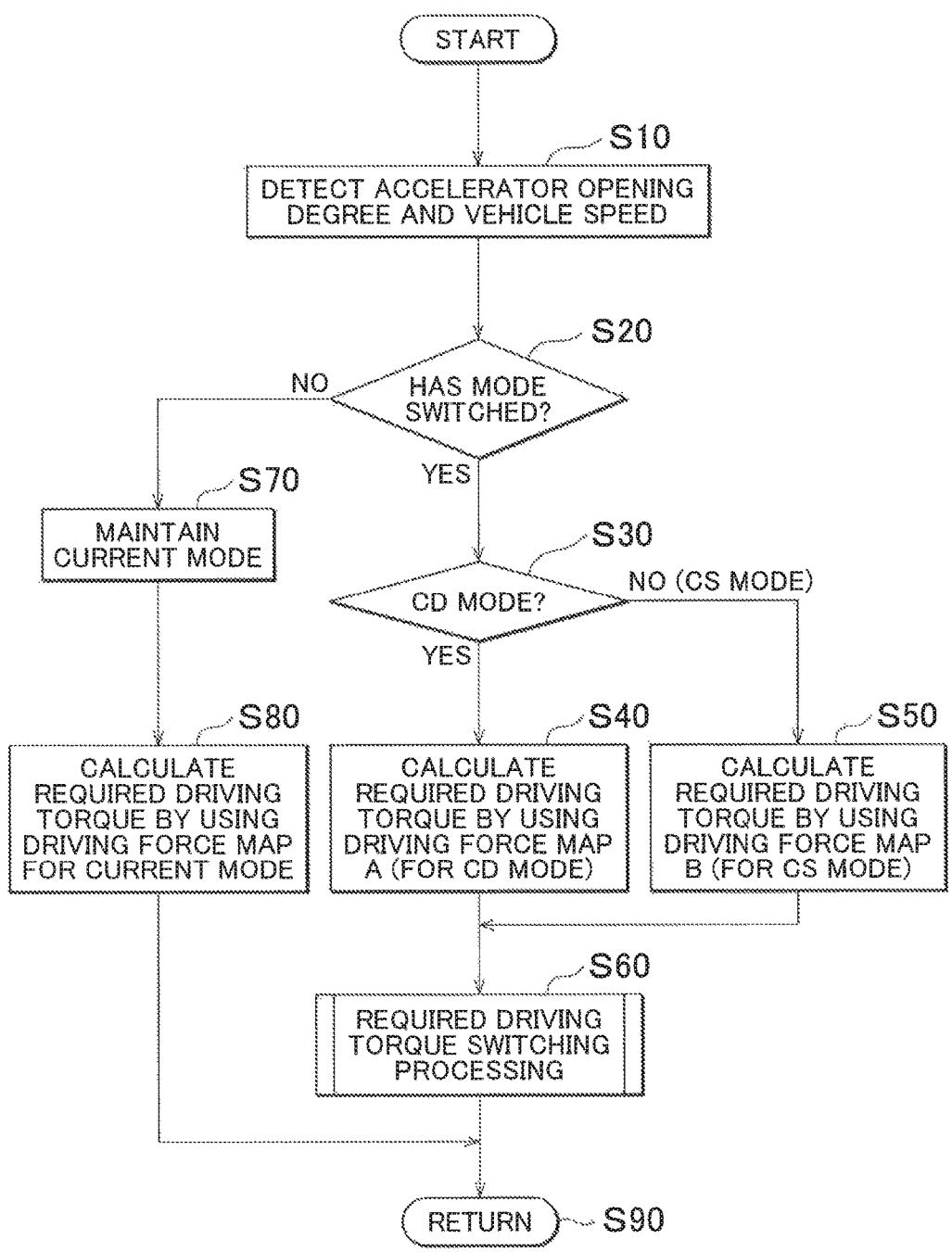
FIG. 4 is a flowchart for showing a processing procedure of a vehicle driving torque (required value) calculation that is executed by an ECU.

FIG. 4 is a flowchart for showing a processing procedure of the vehicle driving torque (required value) calculation that is executed by the ECU 26 which is illustrated in FIG. 1. The processing that is illustrated in this flowchart is called from a main routine and executed at predetermined time intervals or when a predetermined condition is satisfied.

Referring to FIG. 4, the ECU 26 receives detected values of the accelerator opening degree and the vehicle speed (Step S10). The accelerator opening degree is detected by an accelerator opening degree sensor (not illustrated), and the vehicle speed is detected by a vehicle speed sensor that detects the vehicle speed by detecting, for example, an axle rotation speed.

Then, the ECU 26 determines whether or not the mode switching between the CD mode and the CS mode has already been performed (Step S20). The mode switching can be performed, for example, based on the SOC that is illustrated in FIG. 2 or in accordance with the user's operation of the mode switch 28 (FIG. 1).

When it is determined in Step S20 that the mode switching has already been performed (YES in Step S20), the ECU 26 determines whether or not the CD mode is selected (Step S30). In Step S30, it may be determined whether or not the CS mode is selected. When it is determined that the CD mode is selected (YES in Step S30), the ECU 26 calculates a required driving torque for the vehicle (required or target value of the vehicle driving torque) based on the accelerator opening degree and the vehicle speed detected in Step S10 and by using a driving force map A (described later) for the CD mode (Step S40).

When it is determined in Step S30 that the CS mode is selected (NO in Step S30), the ECU 26 calculates the required driving torque based on the accelerator opening degree and the vehicle speed detected in Step S10 by using a driving force map B (described later) for the CS mode (Step S50).

Figure 5:
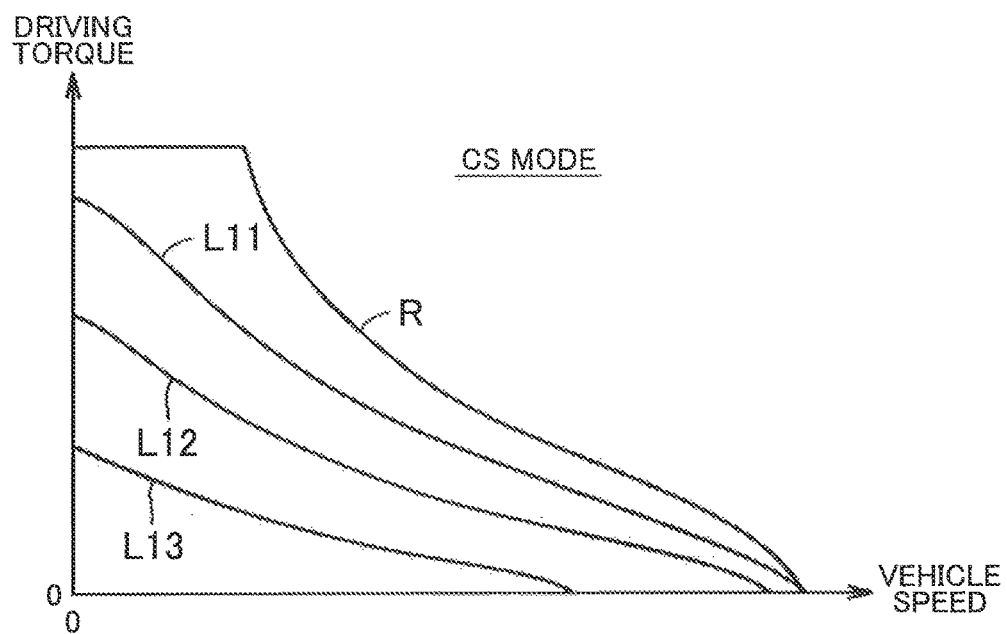
FIG. 5 is a drawing illustrating an example of a driving force map for the CS mode.

FIG. 5 is a drawing illustrating an example of the driving force map B for the CS mode. The horizontal axis in FIG. 5 represents the vehicle speed, and the vertical axis in FIG. 5 represents the driving torque of the vehicle. Line R represents a rated output line. Line L11 represents the driving force characteristic of the vehicle pertaining to a case where the accelerator opening degree is X1%, and Lines L12, L13 represent the driving force characteristics pertaining to a case where the accelerator opening degree is X2% and X3%, respectively (X1>X2>X3). Although only the cases where the accelerator opening degree is X1%, X2%, and X3% are illustrated in the drawing, the line that shows the driving force characteristic moves upward and to the right in the drawing as the accelerator opening degree increases.

Figure 6:
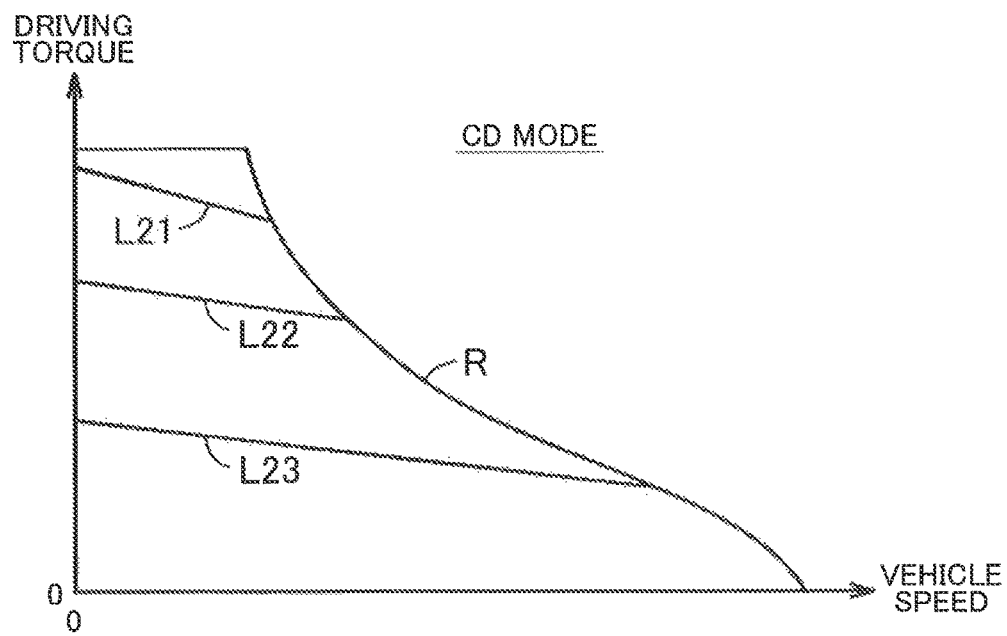
FIG. 6 is a drawing illustrating an example of a driving force map for the CD mode.

FIG. 6 is a drawing illustrating an example of the driving force map A for the CD mode. FIG. 6 is a drawing correlated with FIG. 5. Line L21 in FIG. 6 represents the driving force characteristic of the vehicle pertaining to a case where the accelerator opening degree is X1%, and Lines L22, L23 represent the driving force characteristics pertaining to a case where the accelerator opening degree is X2% and X3%, respectively.

As is apparent from comparisons at the same accelerator opening degree (comparison between Line L11 and Line L21, comparison between Line L12 and Line L22, and comparison between Line L13 and Line L23) referring to FIGS. 5 and 6, when the CD mode is selected (FIG. 6), the driving force characteristics of the vehicle are changed between the CD mode and the CS mode so that the vehicle driving torque with respect to the same vehicle speed and the same accelerator opening degree becomes higher than when the CS mode is selected (FIG. 5). This allows the strong sense of acceleration to be obtained during the EV traveling while the opportunity of the EV traveling is expanded in the CD mode.

As illustrated in FIGS. 5 and 6, it is preferable that the driving force characteristics are changed between the CD mode and the CS mode such that a reduction in the vehicle driving torque depending on an increase in the vehicle speed at the same accelerator opening degree is less when the CD mode is selected (FIG. 6) than when the CS mode is selected (FIG. 5) within a range in which the vehicle driving torque falls below the rated output line R. Specifically, regarding the comparison between Line L12 (CS mode) and Line L22 (CD mode) at the same accelerator opening degree, for example, the slope of Line L22 pertaining to the CD mode (degree of the reduction in the vehicle driving torque depending on the increase in the vehicle speed) is gentler than the slope of Line L12 pertaining to the CS mode. Accordingly, a sense of extended acceleration (feeling that the driving force is maintained with respect to the increase in the vehicle speed) is obtained better when the CD mode is selected than when the CS mode is selected.

Referring back to FIG. 4, the ECU 26 executes a required driving torque switching processing (Step S60) after the calculation of the required driving torque in Step S40 or Step S50. During the required driving torque switching processing, the gradual change processing is executed in which the required driving torque approaches the post-mode switching value from the pre-mode switching value with time. Details of the required driving torque switching processing will be described later.

When it is determined in Step S20 that the mode switching has not been performed (NO in Step S20), the ECU 26 maintains the current mode (CD mode or CS mode) (Step S70). Then, the ECU 26 calculates the required driving torque for the vehicle based on the accelerator opening degree and the vehicle speed detected in Step S10 and by using the driving force map for the current mode (driving force map A provided that the current mode is the CD mode and driving force map B provided that the current mode is the CS mode) (Step S80).

Figure 7:
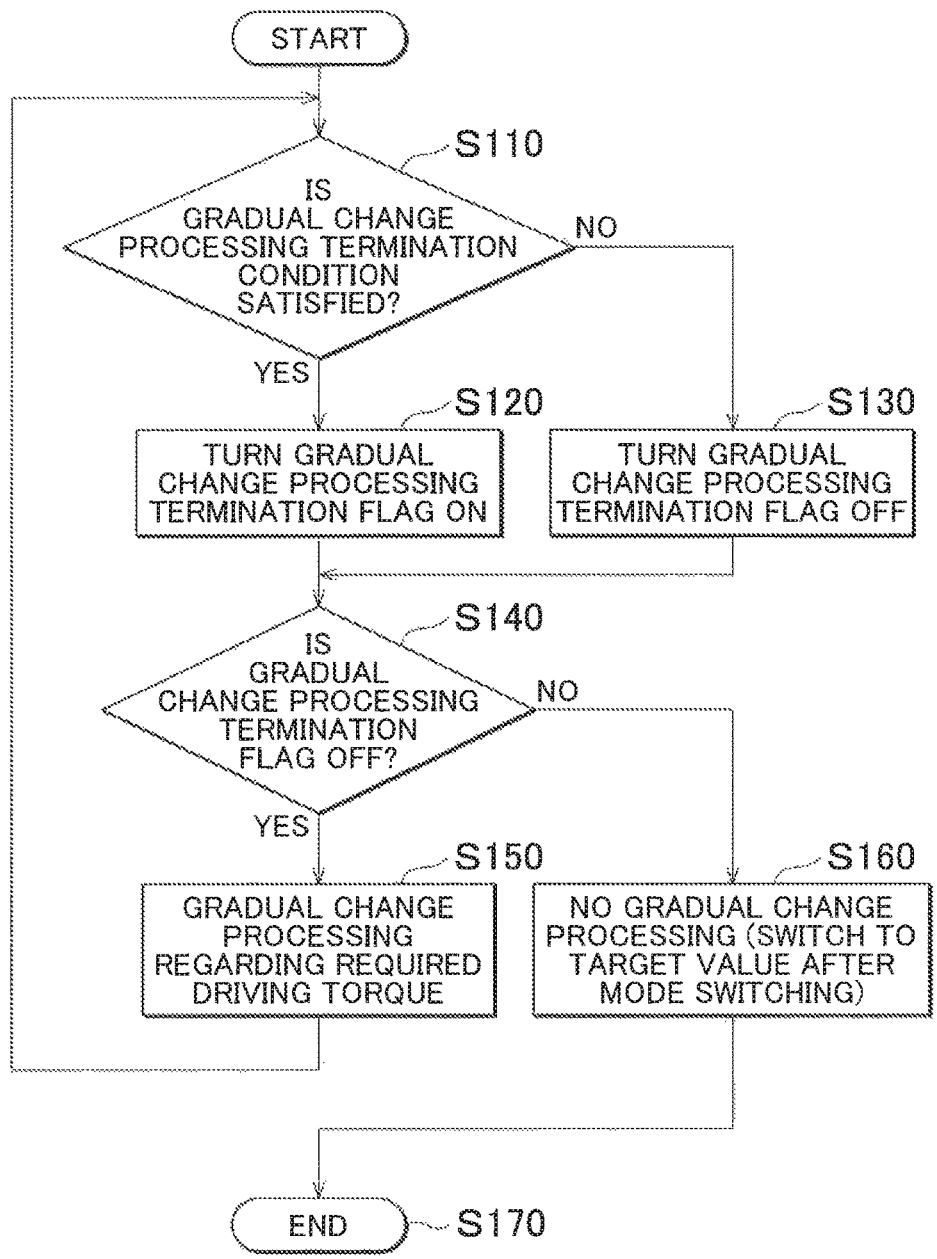
FIG. 7 is a flowchart for showing a procedure of the required driving torque switching processing that is illustrated in FIG. 4.

FIG. 7 is a flowchart for showing a procedure of the required driving torque switching processing that is illustrated in FIG. 4. Referring to FIG. 7, the ECU 26 determines whether or not a gradual change processing termination condition is satisfied (Step S110). The gradual change processing is a processing that allows the speed at which the required driving torque approaches the post-mode switching value from the pre-mode switching value within a predetermined period of time from the mode switching time point to be lower than the speed subsequent to the elapse of the predetermined period of time. For example, the gradual change processing termination condition is satisfied in the case of the elapse of a predetermined period of time when a difference between the required driving torque subsequent to the mode switching (post-switching target value) and a current value of the required driving torque is equal to or less than a predetermined value or in the case of the elapse of a predetermined period of time corresponding to a predetermined length of time from the mode switching.

When it is determined in Step S110 that the gradual change processing termination condition is satisfied (YES in Step S110), the ECU 26 turns ON a gradual change processing termination flag (Step S120). When it is determined in Step S110 that the gradual change processing termination condition is not satisfied (NO in Step S110), the ECU 26 turns OFF the gradual change processing termination flag (Step S130). The gradual change processing termination flag is OFF immediately after the required driving torque switching processing is initiated.

Then, the ECU 26 determines whether or not the gradual change processing termination flag is OFF (Step S140). When it is determined that the gradual change processing termination flag is OFF (YES in Step S140), the ECU 26 executes the gradual change processing regarding the required driving torque (Step S150). Specifically, the ECU 26 adjusts the speed of the change in the vehicle driving torque subsequent to the mode switching within a predetermined period of time by performing, for example, the rate processing for limiting the rate of the change in the vehicle driving torque, the "smoothing" processing for carrying out the delay processing using the delay filter or the like, and the processing for changing the vehicle driving torque in stages on the change in the change of the required driving torque associated with the mode switching. Then, the ECU 26 returns the processing to S110.

When it is determined in Step S140 that the gradual change processing termination flag is ON (NO in Step S140), the ECU 26 does not execute the gradual change processing described above (Step S160). In other words, in this case, the required driving torque is directly changed to the required driving torque subsequent to the mode switching (post-switching target value).

As described above, in Embodiment 1, the gradual change processing described above is executed in a case where the driving force characteristics are changed in accordance with the mode switching, and thus the change in the driving torque associated with the mode switching is reduced. As a result, according to Embodiment 1, the special traveling in the CD mode can be realized and the user's discomfort associated with the realization can be reduced.

Modification Example

When the amount of change in the required driving torque is less than a predetermined value in the case of the change in the driving force characteristics of the vehicle in accordance with the switching between the CD mode and the CS mode, the gradual change processing may not be executed based on an assumption that the mode switching time point is a time point of the elapse of a predetermined period of time. When the amount of change in the required driving torque attributable to the mode switching is less than a predetermined value, the user feels a low level of discomfort, and thus a reduction in torque response associated with the gradual change processing can be lowered to a necessary limit by the predetermined period of time of the execution of the gradual change processing being 0, that is, by the gradual change processing not being executed. A value causing no discomfort on the part of the user even when the period of time of the execution of the gradual change processing is 0, that is, even when the gradual change processing is not executed is set to the predetermined value.

Figure 8:
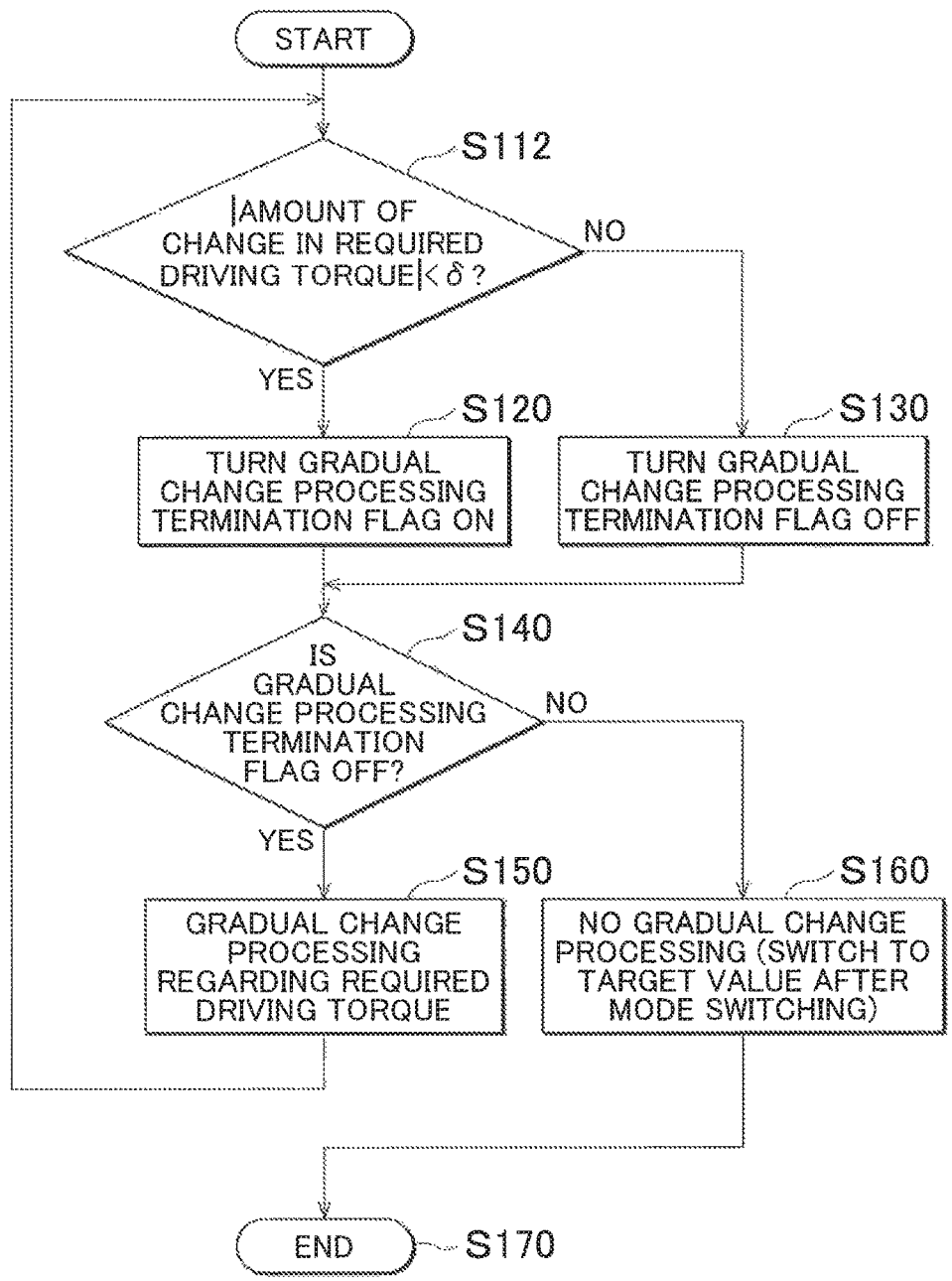
FIG. 8 is a flowchart for showing a procedure of a required driving torque switching processing according to a modification example.

FIG. 8 is a flowchart for showing a procedure of the required driving torque switching processing according to this modification example. This flowchart takes the place of the flowchart according to Embodiment 1 that is illustrated in FIG. 7.

Referring to FIG. 8, this flowchart includes Step S112 instead of Step S110 in the flowchart that is illustrated in FIG. 7. In other words, the ECU 26 first determines whether or not an absolute value of the amount of change in the required driving torque associated with the switching between the CD mode and the CS mode is less than a predetermined value δ (Step S112).

Then, when it is determined that the absolute value of the amount of change in the required driving torque associated with the mode switching is less than the predetermined value δ (YES in Step S112), the processing proceeds to Step S120 and the gradual change processing termination flag is turned ON with a time point following the elapse of a predetermined period of time assumed. Accordingly, in this case, the processing proceeds to the subsequent Step S160, and the required driving torque is directly changed to the required driving torque subsequent to the mode switching (post-switching target value) without the gradual change processing being performed.

When it is determined in Step S112 that the absolute value of the amount of change in the required driving torque associated with the mode switching is equal to or higher than the predetermined value δ (NO in Step S112), the processing proceeds to Step S130 and the gradual change processing termination flag is turned OFF. Accordingly, in this case, the processing proceeds to the subsequent Step S150, and the gradual change processing regarding the required driving torque is executed. The processing returns to Step S112 after the execution of the gradual change processing regarding the required driving torque in Step S150.

According to the above description, the gradual change processing is not executed when the amount of change in the required driving torque is less than a predetermined value. However, the limitation on the change in the required driving torque by the gradual change processing may be relaxed. The limitation on the rate of change may be relaxed in a case where, for example, the rate processing for limiting the rate of change in the vehicle driving torque is used as the gradual change processing. In the case of the "smoothing" processing for carrying out the delay processing using the delay filter or the like, the time constant of the delay processing may be decreased. In a case where the vehicle driving torque is changed in stages, the number of stages of the change may be decreased.

According to this modification example, a reduction in torque response associated with the gradual change processing can be lowered to a necessary limit.

Embodiment 2

In Embodiment 2, the gradual change processing is executed with respect to only the amount of change in the vehicle driving torque attributable to the change in the driving force characteristics, which is calculated during the mode switching, in a case where the driving force characteristics of the vehicle are changed in accordance with the switching between the CD mode and the CS mode.

In a case where the accelerator pedal is increasingly depressed during the execution of the gradual change processing for gradually changing the required driving torque, for example, the required driving torque (target value) subsequent to the mode switching increases, and thus the amount of change in the driving force characteristics increases. Then, the gradual change processing continues to the required driving torque increased by the increasing depression of the accelerator pedal. As a result, the user might feel uncomfortable with a reduction in accelerator response. In this regard, in the hybrid vehicle according to Embodiment 2, the object of the gradual change processing is limited to the amount of change during the mode switching. Accordingly, an unnecessary reduction in the accelerator response can be prevented.

The hybrid vehicle according to Embodiment 2 is similar in overall configuration to the hybrid vehicle 100 illustrated in FIG. 1. The flow of the entire processing for the vehicle driving torque (required value) calculation that is executed by the ECU 26 according to Embodiment 2 is illustrated in the flowchart which is illustrated in FIG. 4. Embodiment 2 differs from Embodiment 1 when it comes to the procedure of the required driving torque switching processing illustrated in FIG. 7.

Figure 9:
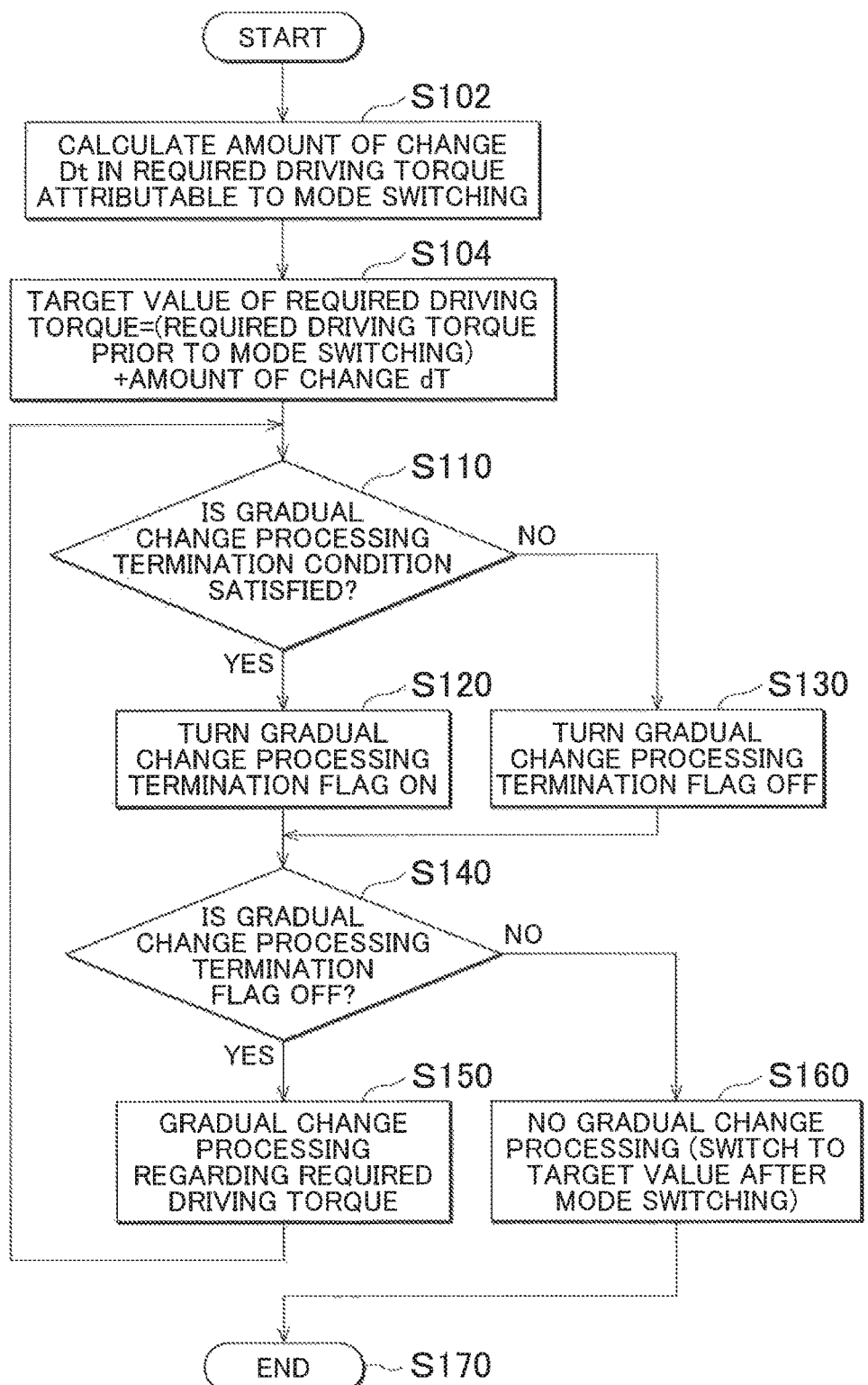
FIG. 9 is a flowchart for showing a procedure of a required driving torque switching processing according to Embodiment 2.

FIG. 9 is a flowchart for showing the procedure of the required driving torque switching processing according to Embodiment 2. Referring to FIG. 9, this flowchart is the flowchart illustrated in FIG. 7 to which Steps S102 and S104 are added.

The ECU 26 first calculates the amount of change dT in the required driving torque attributable to the mode switching (Step S102). Specifically, after the required driving torque subsequent to the mode switching is calculated in Step S40 or Step S50 in the flowchart illustrated in FIG. 4 in the event of the mode switching, the amount of change dT is calculated by the required driving torque prior to (immediately before) the mode switching being subtracted from this required driving torque subsequent to the mode switching that is calculated herein. In other words, the amount of change dT is the amount of change in the required driving torque attributable to the change in the driving force characteristics during the mode switching, and is not affected by an accelerator operation during the gradual change processing associated with the mode switching.

Then, the ECU 26 adds the amount of change dT calculated in Step S102 to the required driving torque prior to (immediately before) the mode switching. In this manner, the ECU 26 calculates a target value of the required driving torque subsequent to the mode switching (Step S104). Then, the ECU 26 allows the processing to proceed to S110.

In Step S110, the gradual change processing termination condition is satisfied in a case where the difference between the required driving torque subsequent to the mode switching (post-switching target value), which is calculated in Step S104, and the current value of the required driving torque is equal to or less than a predetermined value or in the case of the elapse of a predetermined length of time from the mode switching. The target value of the required driving torque subsequent to the mode switching that is calculated in Step S104 is not affected by the change in the required driving torque attributable to the accelerator operation during the gradual change processing associated with the mode switching. In other words, the required driving torque subsequent to the mode switching described above is a value calculated at the mode switching time point, and a predetermined period of time in accordance therewith is set thereto.

The processing that is illustrated in FIG. 9 is a switching processing regarding the required driving torque associated with the mode switching. In a case where the accelerator pedal is increasingly depressed during the gradual change processing regarding this switching processing, for example, torque is changed as a result of the gradual change processing according to the processing illustrated in FIG. 9 and only by the amount of change during the mode switching, and then the amount of the increased accelerator depression is reflected in the required driving torque in Step S80 illustrated in FIG. 4.

As described above, according to Embodiment 2, the object of the gradual change processing is limited to the amount of change during the mode switching. As a result, an unnecessary reduction in the accelerator response can be prevented.

Embodiment 3

In Embodiment 3, the gradual change processing is not executed when the accelerator opening degree changes by at least a predetermined opening degree during the change in the driving force characteristics in a case where the driving force characteristics of the vehicle are changed in accordance with the switching between the CD mode and the CS mode. In a case where the driving force characteristics are changed in accordance with the mode switching, the gradual change processing described above is executed according to Embodiment 3 as well. However, since the gradual change processing is not executed when the accelerator opening degree changes by at least a predetermined opening degree during the change in the driving force characteristics, the torque response can be ensured with respect to the user's accelerator operation.

The hybrid vehicle according to Embodiment 3 is similar in overall configuration to the hybrid vehicle 100 illustrated in FIG. 1. The flow of the entire processing for the vehicle driving torque (required value) calculation that is executed by the ECU 26 according to Embodiment 3 is illustrated in the flowchart which is illustrated in FIG. 4. Embodiment 3 differs from Embodiment 1 when it comes to the procedure of the required driving torque switching processing illustrated in FIG. 7.

Figure 10:
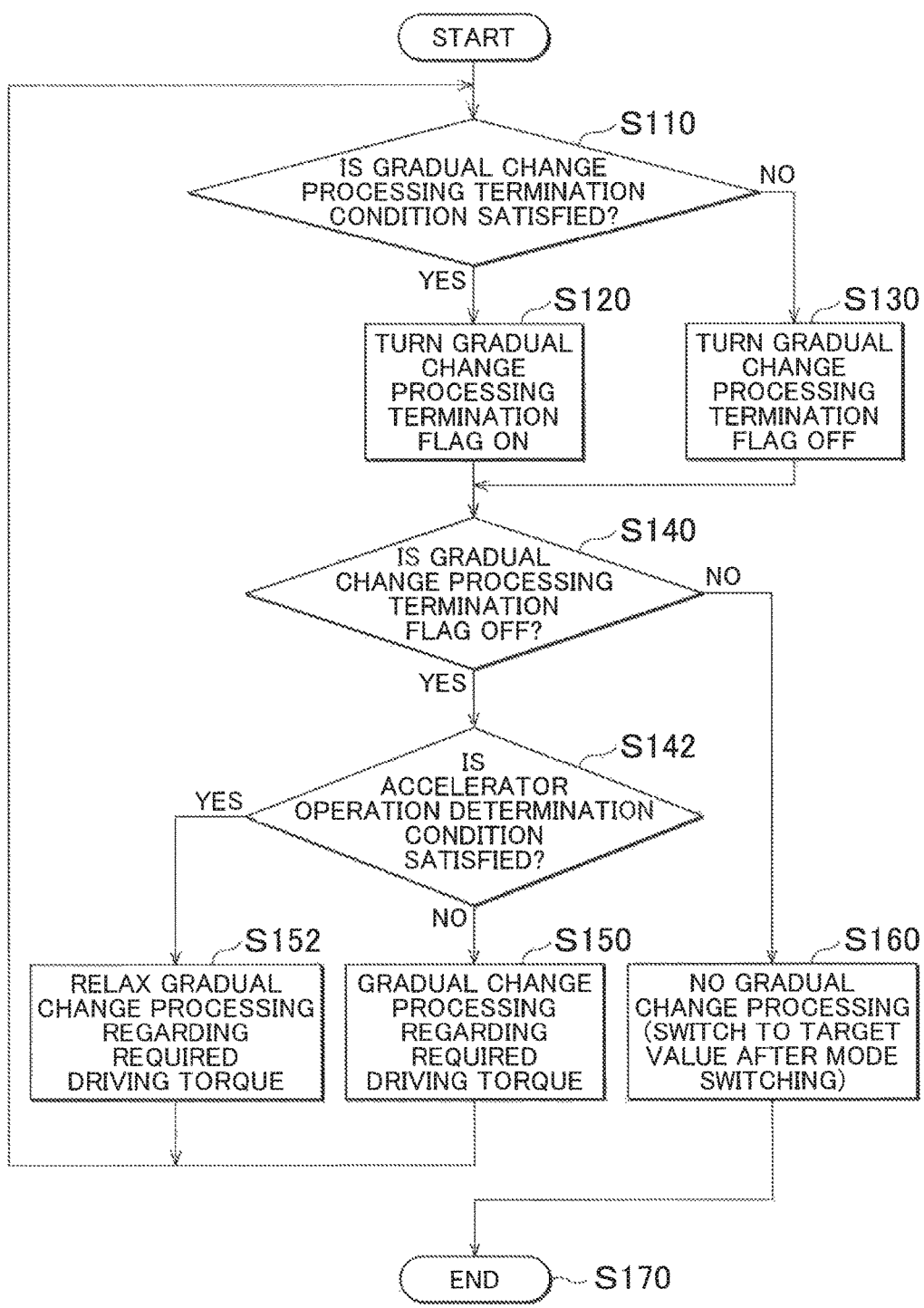
FIG. 10 is a flowchart for showing a procedure of a required driving torque switching processing according to Embodiment 3.

FIG. 10 is a flowchart for showing the procedure of the required driving torque switching processing according to Embodiment 3. Referring to FIG. 10, this flowchart is the flowchart illustrated in FIG. 7 to which Steps S142 and S152 are added.

When it is determined in Step S140 that the gradual change processing termination flag is OFF (YES in Step S140), the ECU 26 determines whether or not an accelerator operation determination condition is satisfied (Step S142). The accelerator operation determination condition is satisfied in a case where, for example, the amount of change in the accelerator opening degree (or the accelerator pedal operation amount itself) is at least a predetermined value or an integrated value of the amount of change in the accelerator opening degree subsequent to the mode switching is at least a predetermined value.

Then, when it is determined in Step S142 that the accelerator operation determination condition is satisfied (YES in Step S142), the ECU 26 relaxes the gradual change processing regarding the required driving torque (Step S152).

Herein, the gradual change processing is not executed. Then, the ECU 26 returns the processing to Step S110. When the gradual change processing is not executed, the required driving torque is directly switched to the value subsequent to the mode switching. Accordingly, in Step S110, it is determined that a gradual change processing termination condition is satisfied.

When it is determined in Step S142 that the accelerator operation determination condition is not satisfied (NO in Step S142), the ECU 26 allows the processing to proceed to S150 and the gradual change processing regarding the required driving torque is executed.

According to the above description, the gradual change processing is not executed in Step S152. However, the limitation on the change in the required driving torque by the gradual change processing may be relaxed (rapid torque change may be allowed). The limitation on the rate of change may be relaxed (high rate of change may be allowed) in a case where, for example, the rate processing is used as the gradual change processing. In the case of the "smoothing" processing for carrying out the delay processing, the time constant of the delay processing may be decreased. In a case where the vehicle driving torque is changed in stages, the number of stages of the change may be decreased.

As described above, according to Embodiment 3, the torque response can be ensured with respect to the user's accelerator operation during the gradual change processing.

The description of each of the embodiments described above covers the control in the hybrid vehicle 100 (FIG. 1) that is configured such that the engine 2 is connected to the two motor generators 6, 10 by the power split device 4. However, a configuration of a hybrid vehicle to which the invention is applied is not limited thereto.

Figure 11:
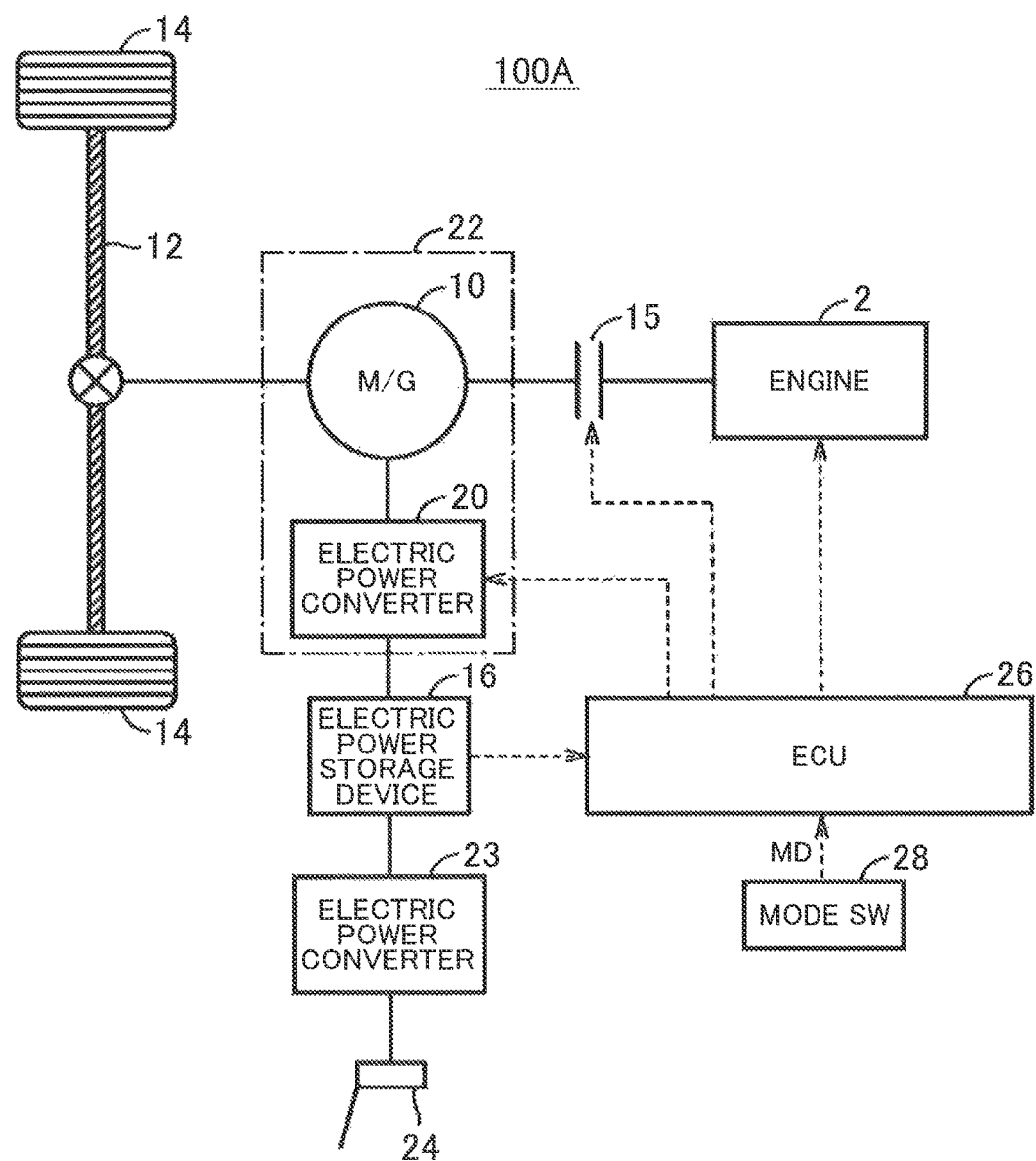
FIG. 11 is a block diagram showing a modification example of the overall configuration of the hybrid vehicle.

As illustrated in FIG. 11, for example, the control described with respect to each of the embodiments described above can also be applied to a hybrid vehicle 100A that is configured such that the engine 2 is connected in series to the single motor generator 10 via a clutch 15.

Although not illustrated herein, the invention can also be applied to a so-called series-type hybrid vehicle in which the engine 2 is used solely for driving the motor generator 6 and the driving force of the vehicle is generated by the motor generator 10 alone.

According to the description of each of the embodiments described above, the hybrid vehicle 100 (100A) is a hybrid car with the electric power storage device 16 that can be externally charged by the external electric power supply. However, the invention can also be applied to a hybrid vehicle that does not have the external charging mechanism (electric power converter 23 and connecting portion 24). Although the CD mode/CS mode are suitable for a hybrid vehicle that can be externally charged, the CD mode/CS mode are not necessarily limited to only the hybrid vehicle that can be externally charged.

In the above description, the engine 2 corresponds to an example of the "internal combustion engine" according to the invention, and the motor generator 10 corresponds to an example of the "electric motor" according to the invention. The ECU 26 corresponds to an example of the "control device" according to the invention, and the electric power converter 23 and the connecting portion 24 form examples of the "charging mechanism" according to the invention.

The embodiments disclosed herein are scheduled to be implemented in appropriate combination as well. It should be noted that the embodiments disclosed herein are merely examples in every aspect and do not limit the invention. The scope of the invention is to be clarified not by the above-described embodiments but by the scope of claims. It is a matter of course that any modification equivalent in meaning and scope to the scope of claims is included in the invention.

What is claimed is:

1. A hybrid vehicle comprising:
an internal combustion engine configured to generate a traveling driving force of the hybrid vehicle;
an electric power storage device;
an electric motor configured to generate the traveling driving force of the hybrid vehicle by receiving electric power supply from the electric power storage device; and
an electronic control unit configured to:
i) determine which one of a first mode and a second mode is selected as a traveling mode of the hybrid vehicle;
ii) control the internal combustion engine and the electric motor such that switching is performed between a third mode in which the hybrid vehicle travels by using the electric motor with the internal combustion engine stopped and a fourth mode in which the hybrid vehicle travels with the internal combustion engine in operation in accordance with a state of the selection of the first mode or the second mode and a required value of vehicle power, the vehicle power being a sum of a required value of driving power of the hybrid vehicle and a required value of required charging power toward the electric power storage device;
iii) control the internal combustion engine and the electric motor such that the switching is performed between the third mode and the fourth mode based on whether or not the required value of the vehicle power is equal to or higher than a threshold;
iv) set the threshold such that the threshold pertaining to a case where the first mode is selected is higher than the threshold pertaining to a case where the second mode is selected;
v) control the internal combustion engine and the electric motor such that a vehicle driving torque with respect to a vehicle speed and an accelerator opening degree pertaining to a case where the first mode is selected exceeds a vehicle driving torque with respect to the same vehicle speed and the same accelerator opening degree pertaining to a case where the second mode is selected; and
vi) control the internal combustion engine and the electric motor during switching between a selected state of the first mode and a selected state of the second mode such that a speed at which the vehicle driving torque approaches a value subsequent to the switching of the selection state from a value prior to the switching of the selection state within a predetermined period of time from a time point of the switching is lower than the speed subsequent to an elapse of the predetermined period of time.

2. The hybrid vehicle according to claim 1, wherein the electronic control unit is configured to control the internal combustion engine and the electric motor within a range in which the vehicle driving torque falls below a predetermined upper limit such that a reduction in the vehicle driving torque depending on an increase in the vehicle speed at the same accelerator opening degree is less when the first mode is selected than when the second mode is selected.

3. The hybrid vehicle according to claim 1, wherein the electronic control unit is configured to regard the time point of the switching of the selection state as a time point of the elapse of the predetermined period of time when the amount of change in the vehicle driving torque attributable to the switching of the selection state is less than a predetermined value.

4. The hybrid vehicle according to claim 1, wherein the electronic control unit is configured to regard a time point when the accelerator opening degree is changed by at least a predetermined opening degree as a time point of the elapse of the predetermined period of time when the accelerator opening degree is changed by at least the predetermined opening degree during a change to the vehicle driving torque subsequent to the switching of the selection state.

5. The hybrid vehicle according to claim 1, wherein the electronic control unit is configured to set a time point of the elapse of the predetermined period of time in accordance with the value of the vehicle driving torque subsequent to the switching of the selection state calculated at the time point of the switching of the selection state after the switching of the selection state.

6. The hybrid vehicle according to claim 1, further comprising:
a charging mechanism configured to charge the electric power storage device by using electric power from an electric power supply outside the vehicle.

* * * * *